(12) United States Patent
Riedl et al.

(10) Patent No.: US 10,749,399 B2
(45) Date of Patent: Aug. 18, 2020

(54) STATOR FOR AN ELECTRICAL MACHINE

(71) Applicant: Robert Bosch GmbH, Stuttgart (DE)

(72) Inventors: Johannes Riedl, Munich (DE);
Alexander Kudlek, Diekholzen (DE);
Patrick Fruehauf, Moelsheim (DE)

(73) Assignee: Robert Bosch GmbH, Stuttgart (GA)

( * ) Notice: Subject to any disclaimer, the term of this patent is extended or adjusted under 35 U.S.C. 154(b) by 0 days.

(21) Appl. No.: 16/336,272

(22) PCT Filed: Aug. 18, 2017

(86) PCT No.: PCT/EP2017/070975
§ 371 (c)(1),
(2) Date: Mar. 25, 2019

(87) PCT Pub. No.: WO2018/059831
PCT Pub. Date: Apr. 5, 2018

(65) Prior Publication Data
US 2019/0214872 A1     Jul. 11, 2019

(30) Foreign Application Priority Data

Sep. 27, 2016 (DE) .......................... 10 2016 218 619
May 23, 2017 (DE) .......................... 10 2017 208 706

(51) Int. Cl.
*H02K 3/28*     (2006.01)
*H02K 3/12*     (2006.01)
*H02K 1/16*     (2006.01)

(52) U.S. Cl.
CPC .................. *H02K 3/28* (2013.01); *H02K 1/16* (2013.01); *H02K 3/12* (2013.01)

(58) Field of Classification Search
CPC ....................................................... H02K 1/16
(Continued)

(56) References Cited

U.S. PATENT DOCUMENTS 6,894,417 B2 * 5/2005 Cai .......................... H02K 3/12
                                                    310/198
6,979,926 B2 * 12/2005 Ogawa ..................... H02K 3/12
                                                    310/179

(Continued)

FOREIGN PATENT DOCUMENTS

DE          10331841         2/2004
JP          2014007795       1/2014

OTHER PUBLICATIONS

International Search Report for Application No. PCT/EP2017/070975 dated Dec. 5, 2017 (English Translation, 2 pages).

*Primary Examiner* — John K Kim
*Assistant Examiner* — Minki Chang
(74) *Attorney, Agent, or Firm* — Michael Best & Friedrich LLP

(57) ABSTRACT

Stators for an electrical machine which are fitted with a polyphase winding which is in the form of a plug-type winding and the winding sections of which run through slots of the stator and comprise a plurality of different conductor elements are already known. At least some of the said conductor elements have in each case two conductor limbs and in each case one connecting conductor which connects the two conductor limbs, wherein an even number of n conductor limbs is arranged one above the other in the radial direction with respect to a stator axis in each slot. Each conductor limb of one of the conductor elements is provided in its slot in a specific position with respect to a slot base of the slot. These polyphase windings comprise a comparatively large number of different conductor elements, in particular so-called special conductors which differ from the standard conductor elements. These special conductors increase the manufacturing costs. In the case of the stator according to the invention, a few different conductor elements are provided for the polyphase winding. According to (Continued)

the invention, it is provided that the lower conductor elements (5) each have conductor limbs (5.1) which are situated in the same position and the upper conductor elements (6) each have conductor limbs (6.1) which are situated in the same position, wherein the step width of the lower conductor elements (5) in relation to the step width of the upper conductor elements (6) differs by the value of one, in particular is greater by the value of one.

16 Claims, 9 Drawing Sheets

(58) Field of Classification Search
USPC .................................................. 310/179–215
See application file for complete search history.

(56) References Cited

U.S. PATENT DOCUMENTS

| 7,348,705 | B2* | 3/2008 | Cai ........................... H02K 3/28 |
| | | | 310/184 |
| 8,749,107 | B2* | 6/2014 | Trammell ................ H02K 3/50 |
| | | | 310/215 |
| 9,379,586 | B2* | 6/2016 | Rahman ................... H02K 3/28 |
| 9,455,605 | B2* | 9/2016 | Saito ........................ H02K 3/28 |
| 9,520,753 | B2* | 12/2016 | Rahman ................... H02K 3/28 |
| 9,847,684 | B2* | 12/2017 | Suzuki ..................... H02K 3/14 |
| 9,871,417 | B2* | 1/2018 | Saito ........................ H02K 3/28 |
| 9,876,405 | B2* | 1/2018 | Han ......................... H02K 3/12 |
| 9,876,406 | B2* | 1/2018 | Han ......................... H02K 3/28 |
| 9,887,596 | B2* | 2/2018 | Tamura .................... H02K 3/24 |
| 2008/0042508 | A1* | 2/2008 | Cai ........................... H02K 3/28 |
| | | | 310/198 |
| 2015/0091408 | A1 | 4/2015 | Azusawa et al. |

* cited by examiner

STATOR FOR AN ELECTRICAL MACHINE

BACKGROUND OF THE INVENTION

The invention starts with a stator for an electric machine.

A stator for an electric machine is already known from JP2014007795 A or DE 103 31 841 A1, which supports a polyphase winding which is formed as a plug winding and whereof the winding strands extend through slots of the stator and comprise a plurality of different conductor elements. At least some of these conductor elements each have two conductor limbs and each have a connecting conductor connecting the two conductor limbs, wherein, in each slot, an even number of n conductor limbs is arranged one above another in the radial direction with respect to a stator axis. Each conductor limb of one of the conductor elements is provided in its slot in a specific layer with respect to a slot base of the slot. The conductor elements lie in the slots in such a way that all connecting conductors lie on the same end face of the stator. Moreover, the ends of the conductor limbs which are remote from the connecting conductors are connected to one another to form the polyphase winding.

These polyphase windings often comprise a comparatively large number of different conductor elements, in particular so-called special connectors, which deviate from the standard conductor elements. These special connectors increase the manufacturing costs.

SUMMARY OF THE INVENTION

In contrast, the stator according to the invention, is advantageous in that fewer different conductor elements are provided for the polyphase winding. This is achieved in that each winding strand comprises lower conductor elements lying in the bottom layer and upper conductor elements lying in the top layer, wherein the lower conductor elements each have conductor limbs lying in the same layer and the upper conductor elements each have conductor limbs lying in the same layer and wherein a specific pitch is provided in each case as a spacing between the conductor limbs of the individual conductor elements, wherein the pitch of the lower conductor elements differs from the pitch of the upper conductor elements by the value one.

According to a first exemplary embodiment of the polyphase winding, a repeating sequence of one of the upper conductor elements and one of the lower conductor elements is provided at least in one of the winding strands. In the individual sequence, therefore, a single lower conductor element follows a single upper conductor element, or vice versa. A stator is thus achieved, whereof the slots each have two conductor limbs of two conductor elements.

It is particularly advantageous if the lower conductor elements each have two ends, which are angled in the same circumferential direction and the upper conductor elements each have two ends which are angled in the same circumferential direction and contrary to the ends of the lower conductor elements. A symmetrically distributed winding and uniformly constructed end windings are thus achieved.

It is furthermore advantageous if the upper conductor elements and the lower conductor elements according to the first exemplary embodiment in the respective winding strand are connected to one another in such a way that a repeating sequence of conductor connections of a different type is produced, which sequence comprises two successive conductor connections of a first type, a conductor connection of a second type and a conductor connection of a third type, wherein the conductor connection of the first type connects a leading conductor limb of one of the conductor elements to a following conductor limb of one of the other conductor elements or vice versa, the conductor connection of the second type connects a leading conductor limb of one of the conductor elements to a leading conductor limb of one of the other conductor elements and the conductor connection of the third type connects a following conductor limb of one of the conductor elements to a following limb of one of the other conductor elements. The sequential arrangement of these three types of conductor connections within one of these sequences is arbitrary, although this sequential arrangement stays the same in the following repeating sequences.

It is very advantageous if each winding strand comprises center conductor elements, which lie between the bottom layer and the top layer, whereof the conductor limbs for each conductor element realize a layer jump of the value one, which have a pitch which corresponds to the greater of the two pitches of the upper and lower conductor elements and which have two ends angled in the opposite circumferential direction. A stator is thus achieved whereof the slots each have an even number of conductor limbs which is greater than two and is, for example, four, six or eight. It is also advantageous if at least one of the winding strands comprises center conductor elements which lie in the slots between the bottom layer and the top layer, whereof the conductor limbs for each conductor element realize a layer jump of the value one and which have a pitch which corresponds to the greater of the two pitches of the upper and lower conductor elements.

It is furthermore advantageous if the center conductor elements have two ends angled in the opposite circumferential direction.

According to a second exemplary embodiment of the polyphase winding, a repeating sequence of one of the upper conductor elements, one or more of the center conductor elements and one of the lower conductor elements and one or more of the center conductor elements is provided in at least one of the winding strands. This sequence can also be provided in the reverse sequential arrangement of the conductor elements described. In the individual sequence, therefore, one or more center conductor elements, a single lower conductor element and subsequently one or more of the center conductor elements follow a single upper conductor element, or vice versa. A stator is thus achieved, whereof the slots each have an even number of conductor limbs, which is greater than two and is, for example, four, six or eight.

It is advantageous if two adjacent slots are provided in each case within one of the magnetic poles, which slots exclusively comprise conductor limbs associated with the same electrical phase and form in-phase slots, wherein, according to the second exemplary embodiment, it is provided that two conductor limbs which are arranged in adjacent in-phase slots in the bottom layer have connecting conductors which extend in the same direction starting from their conductor limbs, and that two conductor limbs which are arranged in adjacent in-phase slots in the top layer have connecting conductors which extend in the opposite direction starting from their conductor limbs. Conversely, according to the second exemplary embodiment, it can also be provided that two conductor limbs which are arranged in adjacent in-phase slots in the top layer have connecting conductors which extend in the same direction starting from their conductor limbs, and that two conductor limbs which are arranged in adjacent in-phase slots in the bottom layer have connecting conductors which extend in the opposite direction starting from their conductor limbs.

It is moreover advantageous if exclusively one winding strand is provided for each electrical phase, which winding strand extends with a tubular first strand section through specific slots of the stator and with a subsequent tubular second strand section through the slots adjacent to the specific slots.

Alternatively, two winding strands can be provided for each electrical phase, which winding strands, stemming from their phase connections, start in two adjacent slots and extend in the opposite circumferential direction to a neutral connection.

It is moreover advantageous if the same pitch is provided in each case between the conductor limbs connected via a conductor connection. A very uniformly constructed end winding is thus produced on the one end face of the stator.

BRIEF DESCRIPTION OF THE DRAWINGS

Three exemplary embodiments of the invention are illustrated in a simplified manner in the drawing and explained in more detail in the description below.

DETAILED DESCRIPTION

Figure 1:
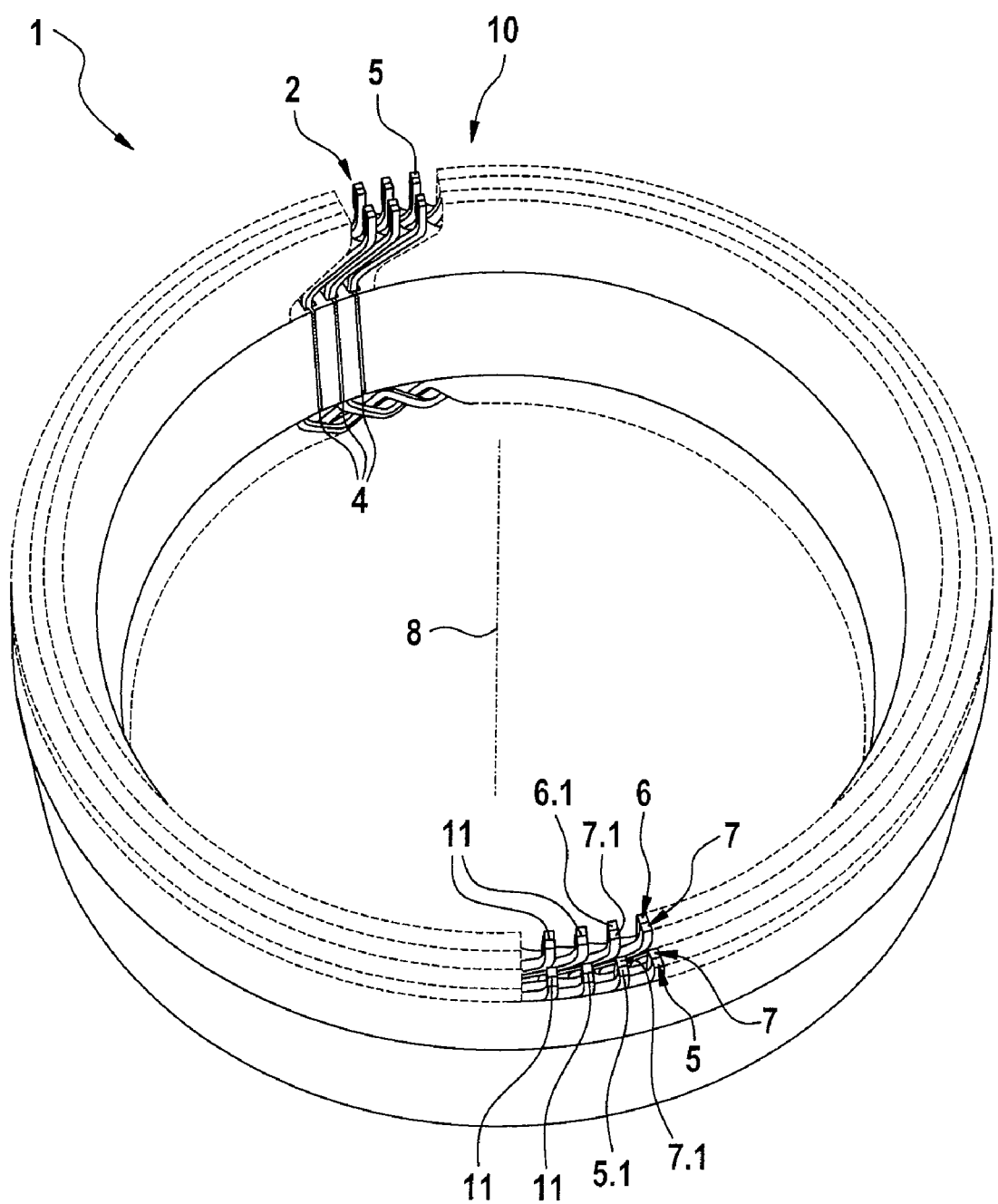
FIG. 1 shows a three-dimensional view of an end face of a stator according to the invention, FIG. 2 a first conductor element of the polyphase winding according to FIG. 1, FIG. 3 a second conductor element of the polyphase winding according to FIG. 1, FIG. 4 a third conductor element of the polyphase winding according to FIG. 1, FIG. 5 a detail of a plan view of the stator according to FIG. 1, in which only four individual conductor elements arranged in the same slot are illustrated, FIG. 6 a three-dimensional view of the other end face of the inventive stator according to FIG. 1, FIG. 7 a winding diagram according to a first exemplary embodiment of the polyphase winding according to the invention, FIG. 8 a winding diagram according to a second exemplary embodiment of the polyphase winding according to the invention and FIG. 9 a winding diagram according to a third exemplary embodiment of the polyphase winding according to the invention.

FIG. 1 shows a three-dimensional view of an end face of an inventive stator having, for example, four conductors for each slot.

The stator 1 of an electric machine has a polyphase winding 2, which is formed as a plug winding, whereof individual winding strands 3 extend through slots 4 of the stator 1 and which comprises a plurality of different conductor elements 5, 6, 7 electrically connected in series. Each winding strand 3 of the polyphase winding 2 is associated with one of the electrical phases u,v,w of the electric machine. In this case, each winding strand 3 can be divided into a plurality of parallel-extending, electrically mutually insulated sub-strands or winding branches. The polyphase winding 2 is, for example, a three-phase or six-phase winding. At least some, in particular a plurality, of these conductor elements 5, 6, 7 are formed according to FIG. 2, FIG. 3 and FIG. 4.

Figure 2:
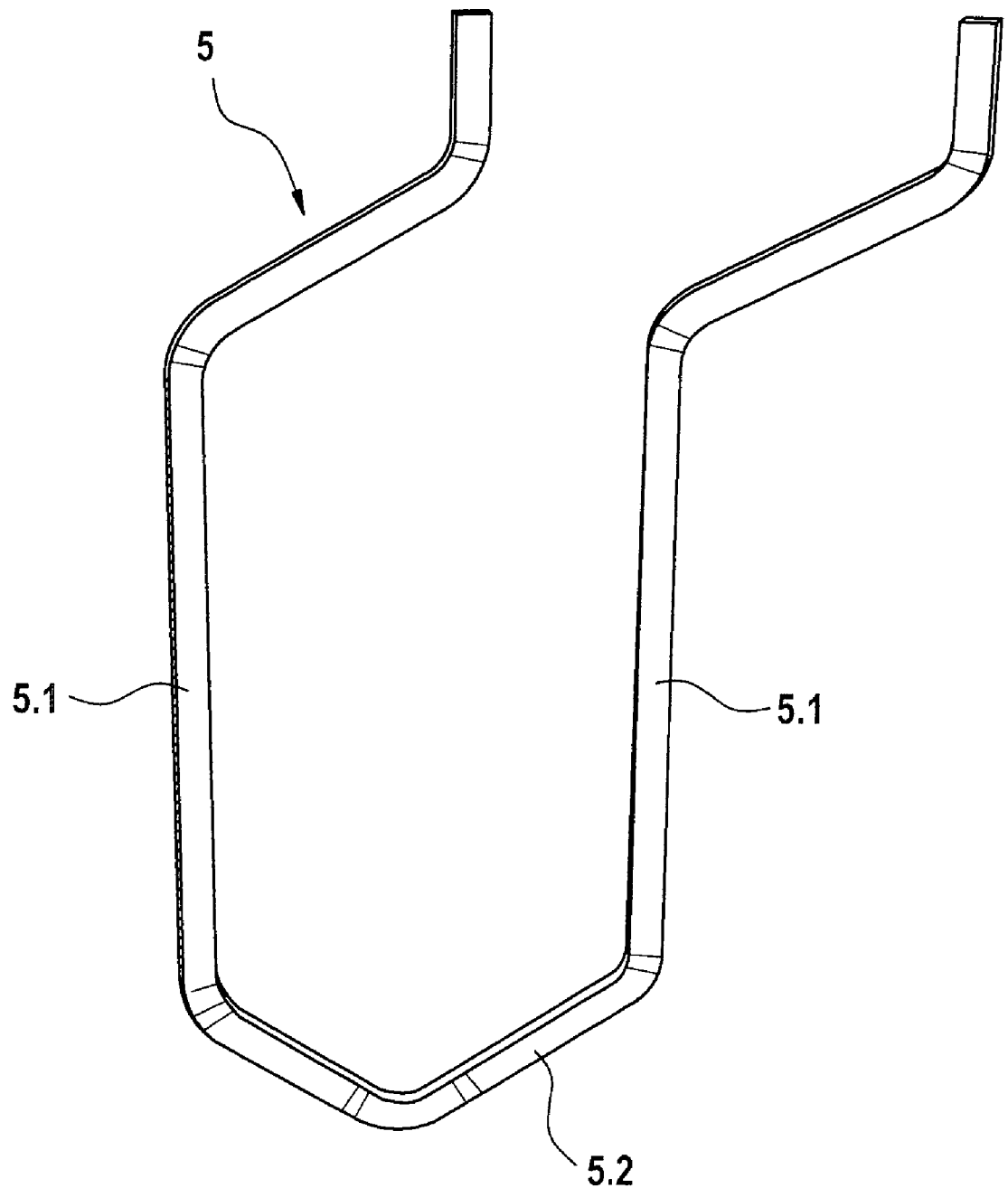
Figure 3:
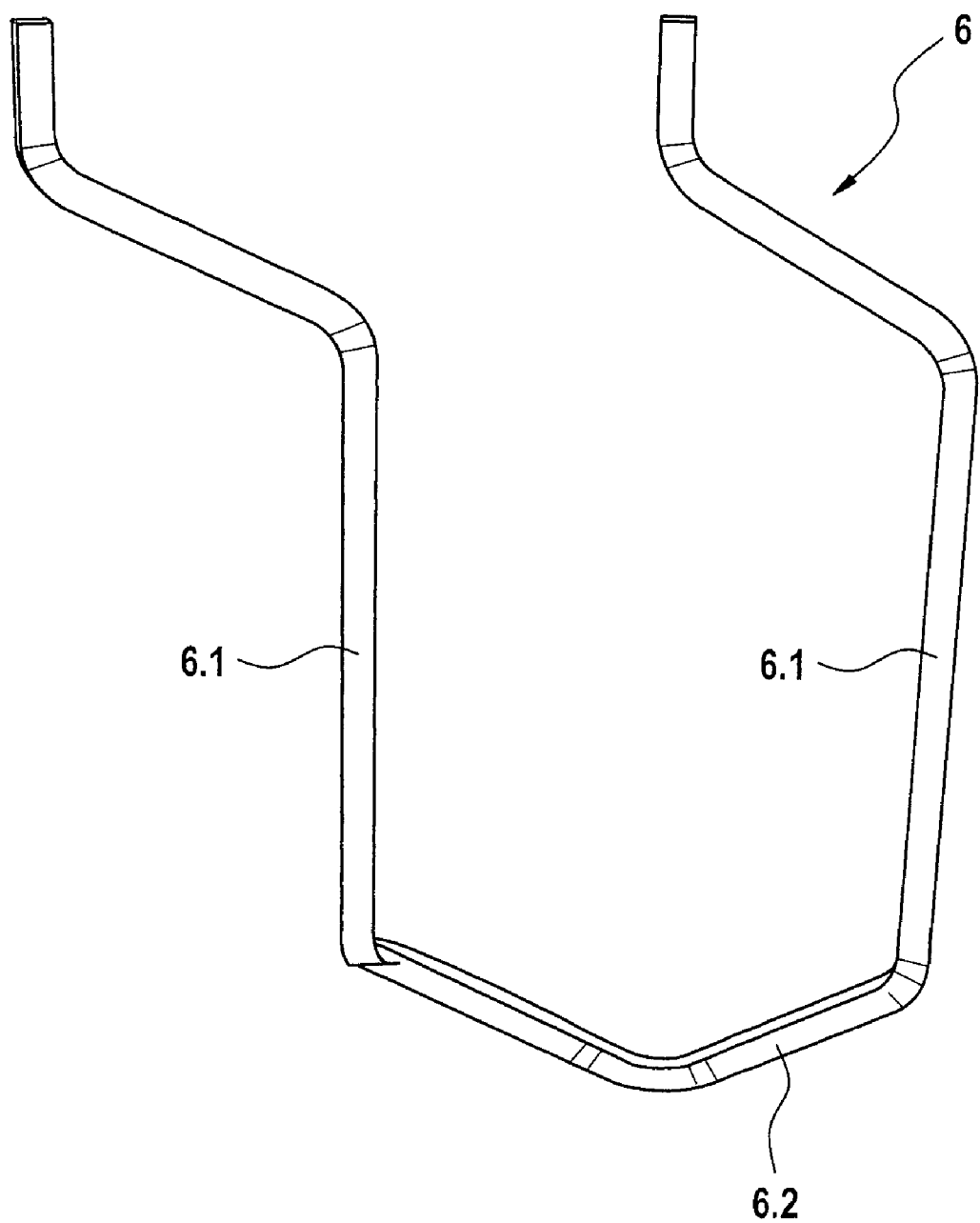
Figure 4:
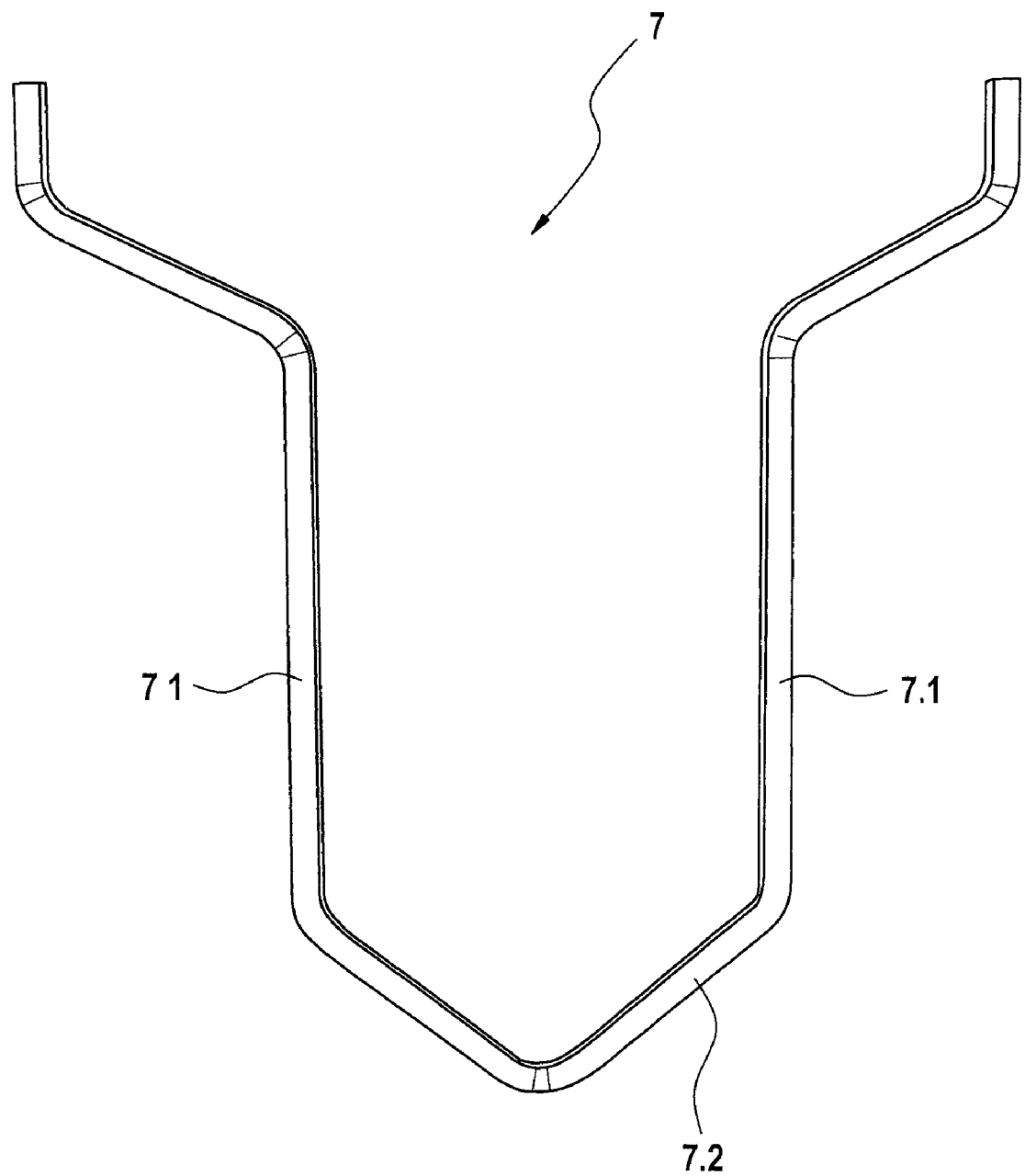

FIG. 2 shows a first conductor element 5, FIG. 3 a second conductor element 6 and FIG. 4 a third conductor element 7 of the plug winding 2 according to FIG. 1. The different conductor elements 5, 6, 7 according to FIG. 2 to FIG. 4 each have two conductor limbs 5.1, 6.1, 7.1 and, in each case, a connecting conductor 5.2, 6.2, 7.2 which connects the two conductor limbs 5.1, 6.1, 7.1, is formed in a U shape or V shape, for example, and can have at least one three-dimensional bend for going round other connecting conductors 5.2, 6.2, 7.2. The conductor elements 5, 6, 7 are each equipped with an electrically insulating lacquer coating. The cross-section of the conductor elements 5, 6, 7 is for example rectangular, although it can also be square, circular or in any other design. The conductor elements 5, 6, 7, in a manner similar to so-called Roebel bars, can also be split into a plurality of parallel, mutually electrically insulated sub-conductor elements which, stacked one above another, form the corresponding conductor element 5, 6, 7 and therefore have a smaller thickness in each case than the single-piece, unsplit conductor element 5, 6, 7. For example, a conductor element 5, 6, 7 can comprise two geometrically parallel-extending sub-conductor elements, each having a rectangular cross-section. In other words, the cross-section of a winding strand 3 can be formed by a plurality of geometrically parallel-extending, mutually electrically insulated sub-conductor elements 5, 6, 7. These sub-conductor elements 5, 6, 7, in particular the upper conductor elements 5, can switch or swap layers with one another in each case from a slot 4 of one magnetic pole $\tau_p$ to the slot 4 of the next magnetic pole $\tau_p$. This has the technical effect that the circuit currents induced in the sub-conductor elements connected in parallel are eliminated and the resultant copper losses are reduced.

Figure 5:
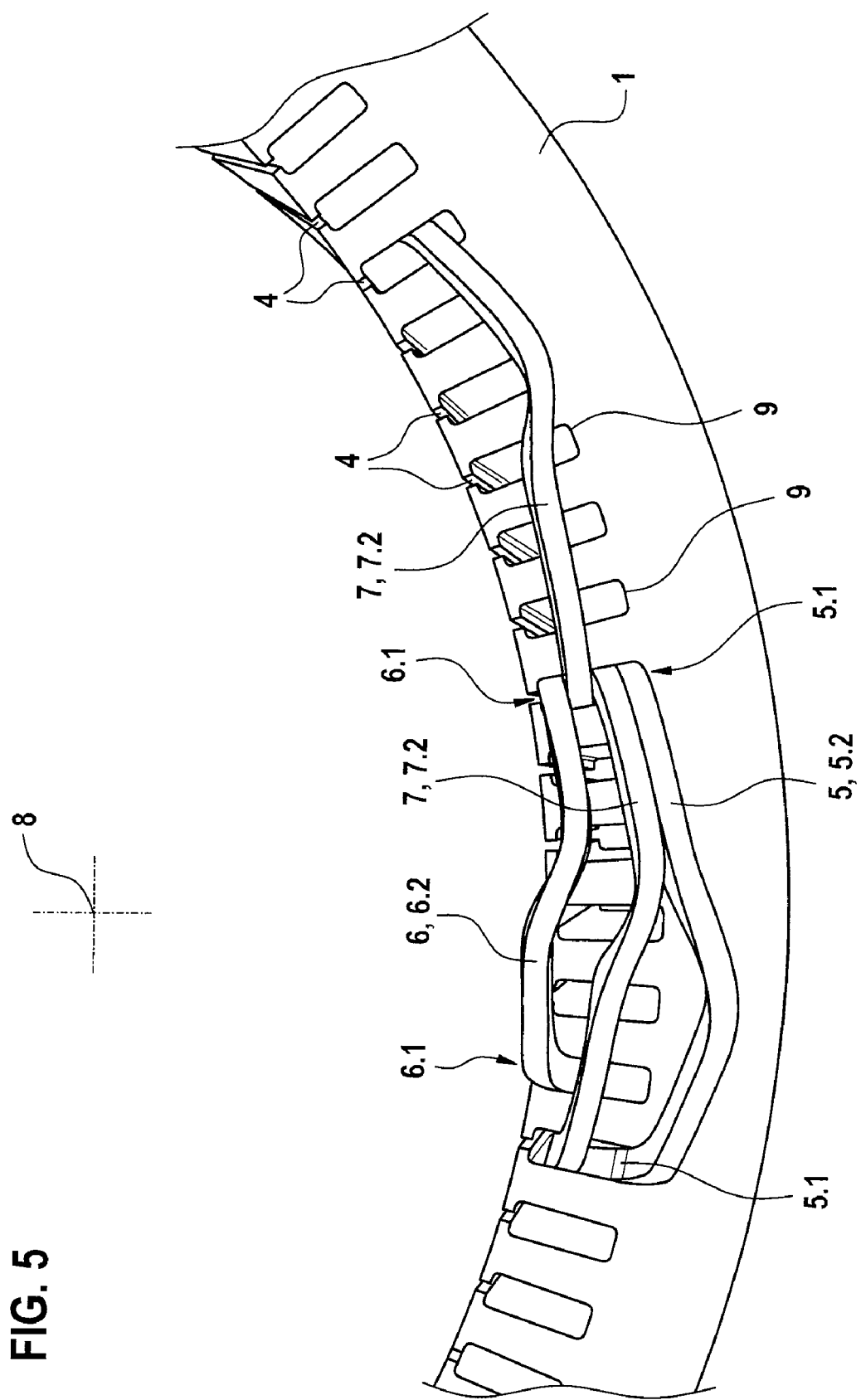

FIG. 5 shows a detail of a plan view of the stator according to FIG. 1, in which only four individual conductor elements 5, 6, 7 of the plug winding 2 according to FIG. 1 are illustrated, which conductor elements are arranged in the same slot 4.

In each slot 4 of the stator 1, an even number of n conductor limbs 5.1, 6.1, 7.1 is arranged one above another in the radial direction with respect to a stator axis 8, wherein each conductor limb 5.1, 6.1, 7.1 of one of the conductor elements 5, 6, 7 is provided in its slot 4 in a specific layer with respect to a slot base 9 of the slot 4. The conductor element 5 is arranged with both conductor limbs 5.1 in the bottom layer in each case, i.e. the first layer with respect to the slot base 9, is referred to below as the lower conductor element 5 and lies on the slot base 9 or is facing the slot base 9. The conductor element 6 lies with both conductor limbs 6.1 in the top layer in each case, according to the exemplary embodiment in the fourth layer counting from the slot base 9, and is referred to below as the upper conductor element 6. According to the second exemplary embodiment, the third conductor elements 7, which are referred to below as center conductor elements 7, are each arranged in the slots 4 between the bottom layer and the top layer, i.e. in the second and third layer according to FIG. 5.

Figure 6:
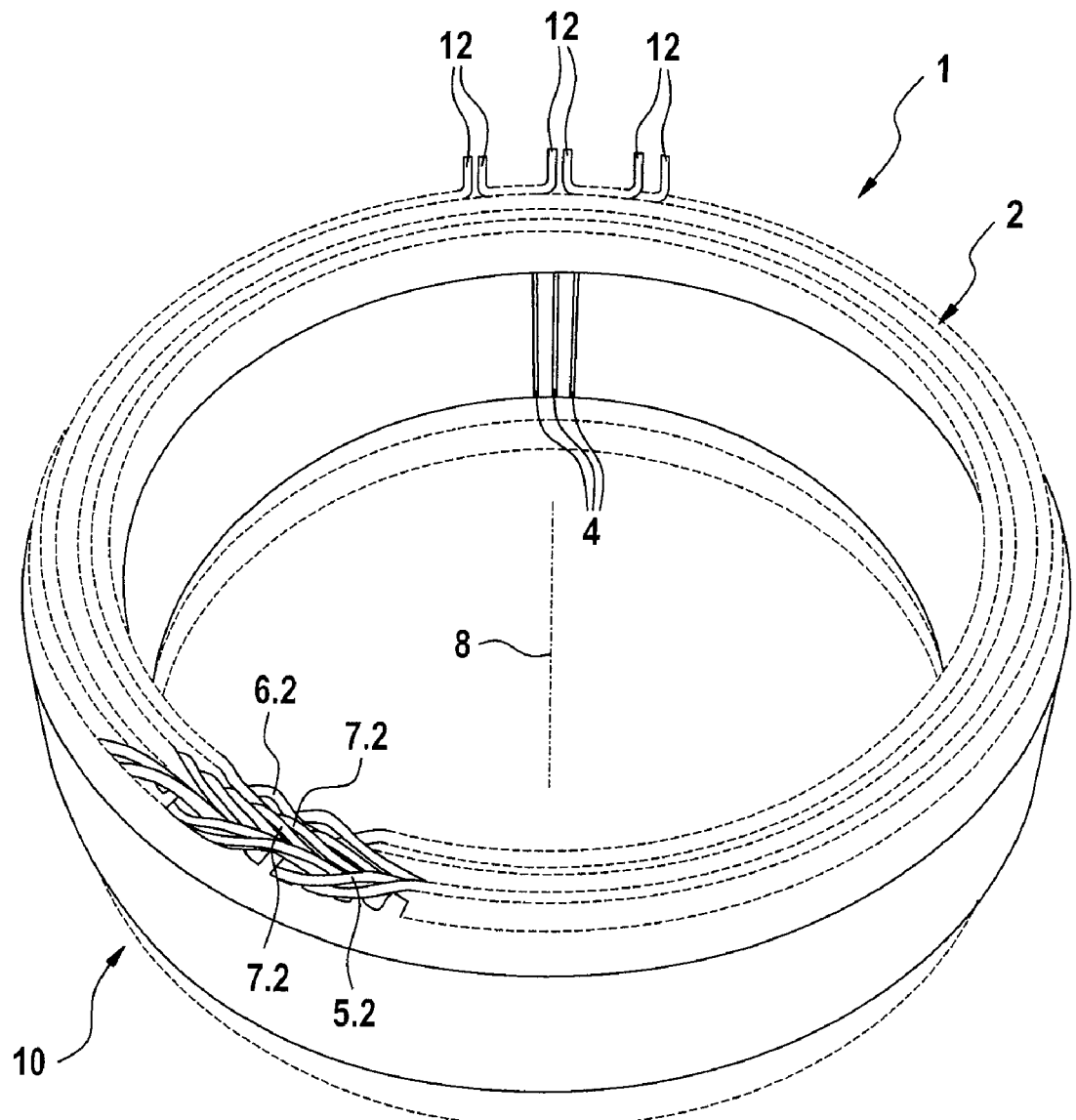

FIG. 6 shows a three-dimensional view of the other end face of the inventive stator according to FIG. 1. According to FIG. 1 and FIG. 6, the conductor elements 5, 6, 7 lie in the slots 4 in such a way that all connecting conductors 5.2, 6.2, 7.2 lie on the same end face of the stator 1. All ends of the conductor limbs 5.1, 6.1, 7.1 which are remote from the connecting conductors 5.2, 6.2, 7.2 thus lie on the same, other end face of the stator 1, which is also referred to as the connecting side 10. The ends of the conductor limbs 5.1, 6.1, 7.1 which are remote from the connecting conductors 5.2, 6.2, 7.2 are connected to one another with material fit to form the plug winding 2, wherein, in each case, two conductor limbs 5.1, 6.1, 7.1 connected to one another with material fit form a conductor connection 11.

According to FIG. 1, all conductor connections 11, which each connect one of the upper conductor elements 6 to one of the center conductor elements 7, are arranged on a first circle whereof the center lies on the stator axis 8. Likewise, all conductor connections 11 which connect one of the lower conductor elements 5 to one of the center conductor elements 7 are provided on a second circle whereof the center lies on the stator axis 8.

The winding strands 3 have phase connections 12 which are provided on the end face of the stator 1 which faces the connecting conductors 5.2, 6.2, 7.2.

At least one of the winding strands 3 comprises the lower conductor elements 5 lying in the bottom layer of the respective slot 4 and the upper conductor elements 6 lying in the top layer of the respective slot 4. The lower conductor elements 5 lie on the slot base 9 and therefore in the bottom layer.

A specific pitch is provided in each case between the conductor limbs 5.1, 6.1, 7.1 which are connected to one another via a connecting conductor 5.2, 6.2, 7.2 or a conductor connection 11, which pitch represents the spacing between the sections of the conductor limbs 5.1, 6.1, 7.1 located in the slots 4 with the number of stator teeth for receiving a winding in the stator 1 or with the number of slots 4 which must be skipped from the first conductor limb to the second conductor limb. According to FIG. 5, the pitch of the lower conductor elements 5 and the pitch of the center conductor elements 7 is for example six slots and the pitch of the upper conductor elements 6 is for example five slots.

According to the invention, it is provided that the lower conductor elements 5 each have conductor limbs 5.1 lying in the same layer and the upper conductor elements 6 each have conductor limbs 6.1 lying in the same layer, wherein the pitch of the lower conductor elements 5 differs from the pitch of the upper conductor elements 6 by the value one, for example is greater or smaller by the value one.

The lower conductor elements 5 each have two ends, which are angled in the same circumferential direction (FIG. 2). The upper conductor elements 6 in turn each have two ends, which are angled in the same circumferential direction and contrary to the ends of the lower conductor elements 5 (FIG. 3). As can be seen in FIG. 5, both conductor limbs 5.1 of the lower conductor elements 5 each lie in the bottom layer on the slot base 9 of their slot 4. Accordingly, the two conductor limbs 6.1 of the upper conductor elements 6 each lie in the top layer of the slot 4.

Figure 7:
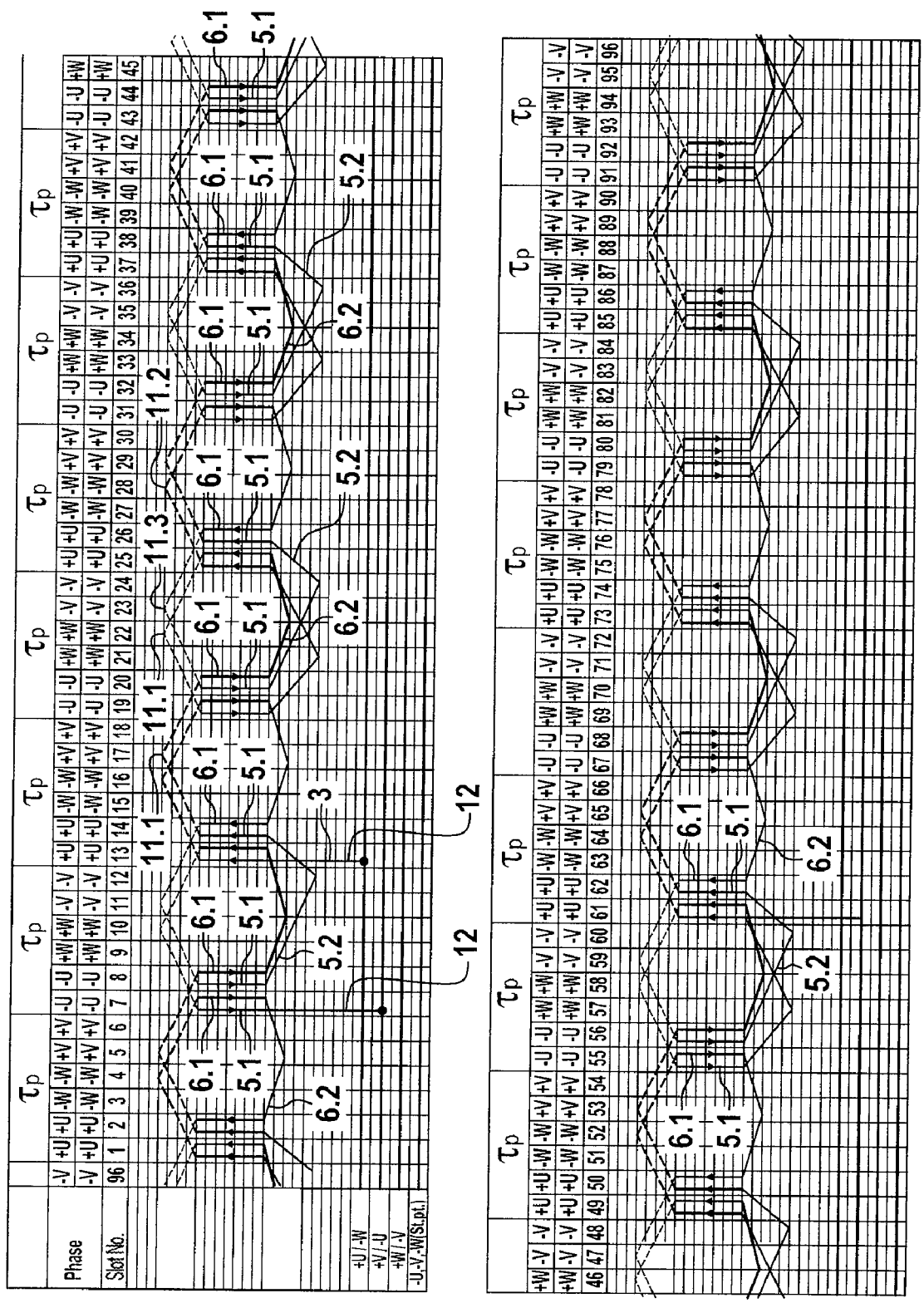

FIG. 7 shows a winding diagram of a first exemplary embodiment of the plug winding 2 according to the invention. This winding diagram illustrates the progression of one of the winding strands 3 through the slots 4 of the stator 1. Each column of the winding diagram represents a slot 4 of the stator 1 which is denoted by a consecutive number. According to the first exemplary embodiment, two conductors or conductor limbs 5.1, 6.1 are provided for each slot 4 in each case. The conductor limb 5.1, 6.1 which is arranged on the far right in one of the columns in each case is located in the bottom layer of the slot 4 and the conductor limb 5.1, 6.1 which is arranged on the far left in one of the columns in each case is located in the top layer of the slot 4. The sections of the conductor limbs 5.1, 6.1 which lie outside the slots 4 on the connecting side 10 are illustrated by dashed lines.

The stator 1 has a plurality of magnetic poles $\tau_p$, wherein each magnetic pole $\tau_p$ comprises a plurality of slots 4 and wherein two adjacent slots 4 are provided within a magnetic pole $\tau_p$, which slots exclusively contain conductor limbs 5.1, 6.1 associated with the same electrical phase u,v,w. This corresponds to a so-called hole count q whereof the value is precisely two.

According to the first exemplary embodiment of the plug winding 2, at least one of the winding strands 3 is formed by a repeating sequence of one of the lower conductor elements 5 and one of the upper conductor elements 6, or vice versa. The first or last conductor element 5, 6 of one of the winding strands 3, as seen from its phase connections 12, can be a special conductor element which is formed differently from the conductor elements 5, 6 according to FIG. 2 and FIG. 3.

As can be seen in FIG. 7, the upper conductor elements 6 and the lower conductor elements 5 in the respective winding strand 3 are connected to one another in such a way that a repeating sequence of conductor connections of a different type is produced, wherein each sequence comprises two successive conductor connections of a first type, a conductor connection of a second type and a conductor connection of a third type.

The conductor connection of the first type connects a leading conductor limb 6.1 (with respect to a specific circumferential direction) of one of the upper conductor elements 6 to a following conductor limb 5.1 of the lower conductor elements 5. Conversely, the conductor connection of the first type can also connect a following conductor limb 5.1 (with respect to a specific circumferential direction) of one of the lower conductor elements 5 to a following conductor limb 6.1 of one of the upper conductor elements 5.

The conductor connection of the second type connects a leading conductor limb 5.1 of one of the lower conductor elements 5 to a leading conductor limb 6.1 of one of the upper conductor elements 6. Conversely, the conductor connection of the second type can also connect a leading conductor limb 6.1 (with respect to a specific circumferential direction) of one of the upper conductor elements 6 to a leading conductor limb 5.1 of one of the lower conductor elements 5.

The conductor connection of the third type connects a following conductor limb 5.1 of one of the lower conductor elements 5 to a following conductor limb 6.1 of one of the upper conductor elements 6. Conversely, the conductor connection of the third type can also connect a following conductor limb 6.1 (with respect to a specific circumferential direction) of one of the upper conductor elements 6 to a following conductor limb 5.1 of one of the lower conductor elements 5.

The sequential arrangement of these three types of conductor connections within one of the sequences is arbitrary, although this sequential arrangement remains the same in the following repeating sequences.

The same pitch is provided in each case between the conductor limbs connected via a conductor connection 11, for example the pitch of six slots according to FIG. 7.

Figure 8:
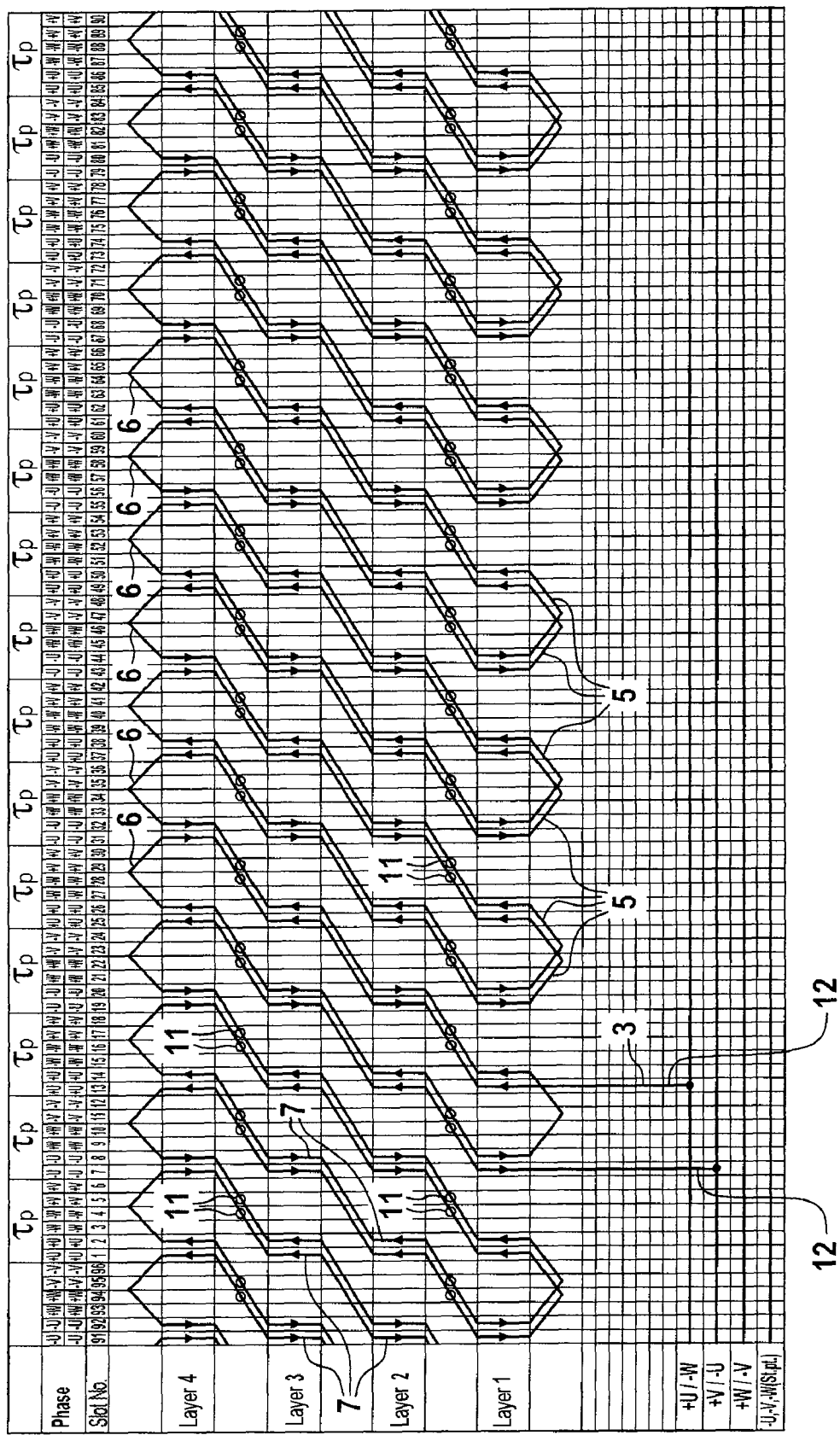

FIG. 8 shows a winding diagram according to a second exemplary embodiment of the inventive polyphase winding according to FIG. 1.

The second exemplary embodiment of the plug winding 2 according to the invention differs from the first exemplary embodiment in that, in at least one of the winding strands 3, center elements 7 according to FIG. 4 are also provided in addition to the lower conductor elements 5 according to FIG. 2 and upper conductor elements 6 according to FIG. 3. Therefore, instead of two conductors or conductor limbs for each slot, four, six, eight or ten conductors are provided for each slot 4, for example, i.e. an even number of conductors, which is greater than two, for each slot.

The center conductor elements 7 lie in the respective slots 4 of the stator 1 exclusively between the bottom layer and the top layer. Moreover, the conductor limbs 7.1 of the center conductor elements 7 realize a layer jump of the value one for each conductor element 7. Moreover, the center conductor elements 7 have a pitch which corresponds to the greater of the two pitches of the upper and lower conductor elements 5, 6. Furthermore, the center conductor elements 7 according to FIG. 4 each have two ends which are angled in the opposite circumferential direction.

According to the second exemplary embodiment, a repeating sequence of one of the upper conductor elements 6, one or more of the center conductor elements 7, one of the lower conductor elements 5 and one or more of the center conductor elements 7, or vice versa, is provided at least in one of the winding strands 3. This sequence can also be provided in the reverse sequential arrangement of the conductor elements 5, 6, 7 described above. In the individual sequence, therefore, one or more center conductor elements 7 and one lower conductor element and then one or more center conductor elements 7 again follow one upper conductor element 6, or vice versa.

According to the second exemplary embodiment in FIG. 4, the conductor limbs 5.1, 6.1, which are arranged in adjacent in-phase slots 4 in the bottom layer, i.e. in layer 1, each have a connecting conductor 5.2, 6.2, wherein, starting from their conductor limbs 5.1, 6.1, these two connecting conductors 5.2, 6.2 extend in the same direction in the adjacent in-phase slots 4. Moreover, the conductor limbs 5.1, 6.1, which are arranged in adjacent in-phase slots 4 in the top layer each have a connecting conductor 5.2, 6.2, wherein, starting from their conductor limbs 5.1, 6.1, these connecting conductors 5.2, 6.2 extend in the opposite direction in the adjacent in-phase slots 4.

Conversely, it can be provided that, starting from their conductor limbs 5.1, 6.1, the connecting conductors 5.2, 6.2 of conductor limbs 5.1, 6.1 which lie in adjacent in-phase slots 4 in the bottom layer extend in the opposite direction in the adjacent in-phase slots 4 and that connecting conductors 5.2, 6.2 of conductor limbs 5.1, 6.1 which are arranged in adjacent in-phase slots 4 in the top layer extend in the same direction.

According to the second exemplary embodiment in FIG. 8, a single inventive winding strand 3 is exclusively provided for each electrical phase, which winding strand alternately comprises successively arranged first and second strand sections extending in a tubular manner, wherein the first tubular strand section extends through specific slots 4 of the stator 1 in each case and the subsequent second tubular strand section extends through the slots 4 which are adjacent to the specific slots 4.

The same pitch is provided in each case between the conductor limbs 5.1, 6.1, 7.1 connected via a conductor connection 11, for example the pitch of six slots according to FIG. 8.

Figure 9:
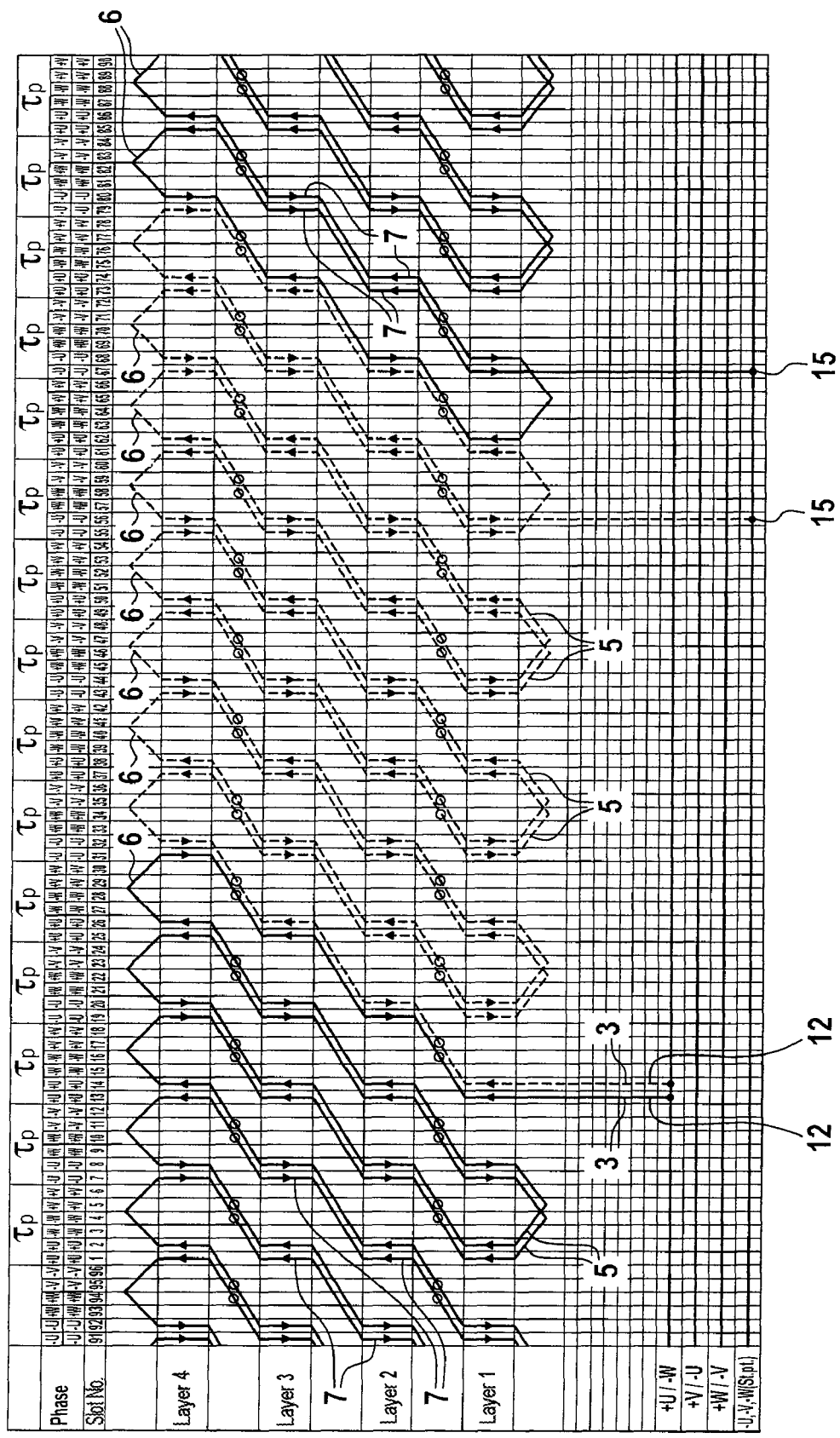

Alternatively, it can be provided according to FIG. 9 that the winding strand 3, with which a specific electrical phase is associated, comprises two electrically parallel winding branches, wherein the winding branches, stemming from their phase connections 12, start in two adjacent slots 4 and extend in the opposite circumferential direction to a phase outlet 15. In this case, each winding branch is formed by a multiplicity of conductor elements electrically connected in series.

The same pitch is provided in each case between the conductor limbs 5.1, 6.1, 7.1 connected via a conductor connection 11, for example the pitch of six slots according to FIG. 9.

The invention claimed is:

1. A stator (1) for an electric machine, which has a polyphase winding (2) formed as a plug winding and whereof winding strands (3) extend through slots (4) of the stator (1) and comprise a plurality of different conductor elements (5, 6, 7), wherein at least some of the conductor elements (5, 6, 7) each have two conductor limbs (5.1, 6.1, 7.1) and each have a connecting conductor (5.2, 6.2, 7.2) connecting the two conductor limbs (5.1, 6.1, 7.1), wherein
 in each slot (4), an even number of n conductor limbs (5.1, 6.1, 7.1) is arranged one above another in a radial direction with respect to a stator axis (8), wherein
 each conductor limb (5.1, 6.1, 7.1) of a conductor element (5, 6, 7) is provided in a respective slot (4) in a specific layer with respect to a slot base (9) of the slot (4), wherein
 the conductor elements (5, 6, 7) lie in the slots (4) in such a way that all connecting conductors (5.2, 6.2, 7.2) lie on the same end face of the stator (1), wherein
 ends of the conductor limbs (5.1, 6.1, 7.1) which are remote from the connecting conductors (5.2, 6.2, 7.2) are connected to one another on a connecting side (10) to form the polyphase winding (2), wherein, in each case, two conductor limbs (5.1, 6.1, 7.1) connected to one another with material fit form a conductor connection (11), wherein
 at least one of the winding strands (3) comprises lower conductor elements (5) lying in a bottom layer facing the slot base (9) and upper conductor elements (6) lying in a top layer, wherein
 a specific pitch is provided in each case between sections of the conductor limbs (5.1, 6.1, 7.1), connected to one another via a connecting conductor (5.2, 6.2, 7.2) or a conductor connection (11), which are located in the slots (4), which pitch represents a spacing between the conductor limbs (5.1, 6.1, 7.1) with the number of slots (4) in the stator (1) which are to receive windings, and wherein
 the lower conductor elements (5) each have conductor limbs (5.1) lying in the same layer and the upper conductor elements (6) each have conductor limbs (6.1) lying in the same layer, wherein the pitch of the lower conductor elements (5) differs from the pitch of the upper conductor elements (6) by the value one.

2. The stator as claimed in claim 1, characterized in that the lower conductor elements (5) each have two ends, which are angled in the same circumferential direction and the upper conductor elements (6) each have two ends which are angled in the same circumferential direction and contrary to the ends of the lower conductor elements (5).

3. The stator as claimed in claim 1, characterized in that a repeating sequence of one of the upper conductor elements (6) and one of the lower conductor elements (5) is provided at least in one of the winding strands (3).

4. The stator as claimed in claim 3, characterized in that the upper conductor elements (6) and the lower conductor elements (5) in the respective winding strand (3) are connected to one another to produce a repeating sequence of conductor connections (11) that is of a different type and that comprises two successive conductor connections (11.1) of a first type, a conductor connection (11.2) of a second type and a conductor connection (11.3) of a third type, wherein the conductor connection (11.1) of the first type connects a leading conductor limb of one of the conductor elements (5, 6, 7) to a following conductor limb of one of the other conductor elements (5, 6, 7) or vice versa, wherein the conductor connection (11.2) of the second type connects a leading conductor limb of one of the conductor elements (5, 6, 7) to a leading conductor limb of one of the other conductor elements (5, 6, 7) and wherein the conductor connection (11.3) of the third type connects a following conductor limb of one of the conductor elements (5, 6, 7) to a following conductor limb of one of the other conductor elements (5, 6, 7).

5. The stator as claimed in claim 1, characterized in that at least one of the winding strands (3) comprises center conductor elements (7), which lie in the slots (4) between the bottom layer and the top layer, whereof the conductor limbs (7.1) for each conductor element (7) realize a conductor jump of the value one and which have a pitch which corresponds to the greater of the two pitches of the upper and lower conductor elements (5, 6).

6. The stator as claimed in claim 5, characterized in that the center conductor elements (7) have two ends which are angled in the opposite circumferential direction.

7. The stator as claimed in claim 5, characterized in that a repeating sequence of one of the upper conductor elements (6), one or more of the center conductor elements (7), one of the lower conductor elements (5) and one or more of the center conductor elements (7), or vice versa, is provided at least in one of the winding strands (7).

8. The stator as claimed in claim 7, characterized in that two adjacent slots (4) are provided in each case within one of the magnetic poles ($\tau_p$), which slots exclusively comprise conductor limbs (5.1, 6.1, 7.1) associated with the same electrical phase (u, v, w) and form in-phase slots, wherein two conductor limbs (5.1, 6.1, 7.1) which are arranged in adjacent in-phase slots (4) in the bottom layer have connecting conductors (5.2, 6.2, 7.2) which extend in the same direction starting from their conductor limbs (5.1, 6.1, 7.1), and in that two conductor limbs (5.1, 6.1, 7.1) which are arranged in adjacent in-phase slots (4) in the top layer have connecting conductors (5.2, 6.2, 7.2) which extend in the opposite direction starting from their conductor limbs (5.1, 6.1, 7.1), or vice versa with respect to the top and bottom layer.

9. The stator as claimed in claim 1, characterized in that exclusively one winding strand (3) is provided for each electrical phase (u, v, w), which winding strand extends with a tubular first strand section through specific slots (4) of the stator (1) and with a subsequent tubular second strand section through the slots (4) adjacent to the specific slots (4).

10. The stator as claimed in claim 1, characterized in that the cross-section of a winding strand (3) is formed by a plurality of geometrically parallel-extending, mutually electrically insulated sub-conductor elements (5, 6, 7).

11. The stator as claimed in claim 10, characterized in that the sub-conductor elements (5, 6, 7) switch layers with one another in each case from one slot (4) of a magnetic pole ($\tau_p$) to the slot (4) of the next magnetic pole ($\tau_p$).

12. The stator as claimed in claim 10, characterized in that the upper conductor elements (5, 6, 7) switch layers with one another in each case from one slot (4) of a magnetic pole ($\tau_p$) to the slot (4) of the next magnetic pole ($\tau_p$).

13. The stator as claimed in claim 1, characterized in that the winding strand (3) of an electrical phase comprises two electrically parallel winding branches which, stemming from their phase connection (12), start in two adjacent slots (4) and extend in the opposite circumferential direction to a phase outlet (15).

14. The stator as claimed in claim 1, characterized in that the same pitch is provided in each case between the conductor limbs (5.1, 6.1, 7.1) connected via a conductor connection (11).

15. An electric machine having a stator as claimed in claim 1.

16. The stator as claimed in claim 1, wherein the pitch of the lower conductor elements (5) is greater than the pitch of the upper conductor elements (6) by the value one.

* * * * *